United States Patent
Kilari et al.

(10) Patent No.: US 11,990,058 B2
(45) Date of Patent: *May 21, 2024

(54) MACHINE GRADING OF SHORT ANSWERS WITH EXPLANATIONS

(71) Applicant: QUIZLET, INC., San Francisco, CA (US)

(72) Inventors: Murali krishna teja Kilari, San Francisco, CA (US); Shane Curtis Mooney, San Mateo, CA (US); Lingfeng Cheng, Burlingame, CA (US)

(73) Assignee: Quizlet, Inc., San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/947,944

(22) Filed: Sep. 19, 2022

(65) Prior Publication Data

US 2023/0120965 A1 Apr. 20, 2023

Related U.S. Application Data

(63) Continuation of application No. 17/501,429, filed on Oct. 14, 2021, now Pat. No. 11,450,225.

(51) Int. Cl.
*G09B 7/04* (2006.01)
*G06F 17/18* (2006.01)
(Continued)

(52) U.S. Cl.
CPC .............. *G09B 7/04* (2013.01); *G06F 17/18* (2013.01); *G06F 40/20* (2020.01); *G06N 20/20* (2019.01)

(58) Field of Classification Search
None
See application file for complete search history.

(56) References Cited

U.S. PATENT DOCUMENTS 10,373,512 B2 * 8/2019 Lan .................... G06F 17/10
10,490,092 B2 * 11/2019 Dohring ............... G09B 19/025
(Continued)

OTHER PUBLICATIONS

Cloudera Fast Forward Labs, a machine learning research group "How to explain HuggingFace BERT for Questioning Answering NLP Models with TF 2.0", Jun. 22, 2020, 21 pages.
(Continued)

*Primary Examiner* — Xuan M Thai
*Assistant Examiner* — Sadaruz Zaman
(74) *Attorney, Agent, or Firm* — Baker Botts L.L.P.

(57) ABSTRACT

An example method embodying the disclosed technology comprises: digitally storing Teacher models and a Student model at a server computer; training each model with a corpus of unlabeled training data using Masked Language Modeling; fine-tuning each Teacher model for an ASAG task with labeled ground truth data; executing each Teacher model to generate and digitally store a respective set of class probabilities on an unlabeled task-specific data set for the ASAG task; further training the Student model by a linear ensemble of the Teacher models using KD; receiving, at the server computer, digital input comprising a target response text and a corresponding target reference answer text; programmatically inputting the target response text and the corresponding target reference answer text to the Student model, thereby outputting a corresponding predicted binary label; displaying correction data indicating the corresponding predicted binary label in a GUI; and, optionally, displaying explainability data in the GUI.

20 Claims, 5 Drawing Sheets

(51) Int. Cl.
*G06F 40/20* (2020.01)
*G06N 20/20* (2019.01)

(56) References Cited

U.S. PATENT DOCUMENTS

| | | | |
|---|---|---|---|
| 10,733,899 B2* | 8/2020 | Lee | G09B 7/04 |
| 11,341,326 B2* | 5/2022 | Wang | G06N 3/08 |
| 11,450,225 B1* | 9/2022 | Kilari | G09B 7/04 |
| 11,551,570 B2* | 1/2023 | Crosta | G09B 7/02 |
| 2012/0254333 A1 | 10/2012 | Chandramouli | |
| 2016/0314255 A1 | 10/2016 | Cook | |
| 2017/0132528 A1 | 5/2017 | Aslan | |
| 2019/0279042 A1 | 9/2019 | Cataltepe | |
| 2019/0378006 A1* | 12/2019 | Fukuda | G06N 3/08 |
| 2020/0097850 A1 | 3/2020 | Bae | |
| 2020/0110982 A1* | 4/2020 | Gou | G06F 16/904 |
| 2020/0134427 A1 | 4/2020 | Oh | |
| 2020/0234192 A1 | 7/2020 | Vinyals | |
| 2020/0334520 A1 | 10/2020 | Chen | |
| 2021/0110273 A1* | 4/2021 | Kwon | G06N 99/00 |
| 2021/0110294 A1 | 4/2021 | Elewitz | |
| 2021/0150330 A1 | 5/2021 | Sharma | |
| 2021/0158126 A1* | 5/2021 | Li | G06N 3/08 |
| 2021/0241037 A1 | 8/2021 | Lisowska | |
| 2021/0241156 A1 | 8/2021 | Lai | |
| 2021/0304069 A1 | 9/2021 | Tang | |
| 2021/0375269 A1* | 12/2021 | Yavuz | G10L 15/063 |
| 2022/0004966 A1* | 1/2022 | Essafi | G06N 5/022 |
| 2022/0005371 A1* | 1/2022 | Hnich | G06N 7/01 |
| 2022/0020283 A1 | 1/2022 | Dhavala | |
| 2022/0067274 A1 | 3/2022 | Wang | |
| 2022/0101184 A1* | 3/2022 | Asif | G06N 3/045 |
| 2022/0138633 A1* | 5/2022 | Choi | G06V 10/7747 |
| | | | 706/12 |
| 2022/0383190 A1* | 12/2022 | He | G06N 3/045 |

OTHER PUBLICATIONS

Yu Gu et al. "Domain specific language model pretraining for Biomedical Natural Language Processing", Oct. 2021, ACM transaction for computing for health care, vol. 3, No. 1, Article 2, 23 pages.

Salazar et al. "Masked Language Model Scoring", Jan. 2021, Amazon AWSAI, University of Notre Dame, USA. 14 pages.

Mishra et al. "Confidence conditioned knowledge distillation", Jul. 2021, Department of Aerospace Engineering, Indian Institute of Science, Bangalore. 31 pages.

Camus et al. "Investigating transformer for automatic short answer grading", Jun. 10, 2020, artificial intelligence in Education, USA. 6 pages.

* cited by examiner

| Reference Answer | Written Answer | Grade |
|---|---|---|
| coating the surface of microbes, making it easier for other defense cells to phagocytize them _412_ | making it simple for defense cells to phagocytize microbes by coating them _422_ | 0.94 |
| people who make the final decision e.g senior managers / specialists _412_ | the person who makes the overall decision _422_ | 0.67 _432_ |

| Reference Answer | Written Answer | Grade |
|---|---|---|
| inferior articular process _412_ | superior articular facet _422_ | 0.27 _432_ |

MACHINE GRADING OF SHORT ANSWERS WITH EXPLANATIONS

CROSS-REFERENCE TO RELATED APPLICATIONS

This application claims the benefit as a continuation under 35 U.S.C. 120 of U.S. patent application Ser. No. 17/501,429, filed 14 Oct. 2021.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Quizlet, Inc.

TECHNICAL FIELD

One technical field of the present disclosure is computer-implemented artificial intelligence, in the subfield of natural language processing, using models that are programmed to solve an Automated Short Answer Grading task. Another technical field is machine learning model development, training, deployment, and operationalization. Another technical field is the incorporation of explainability into machine learning models. Another technical field is automated systems, such as computer-implemented SaaS systems for automatically grading, at a server computer, short answer responses to questions transmitted over a network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern online learning systems have made targeted instruction—in a wide variety of subjects—more accessible than ever before. Outside of traditional educational institutions, diverse groups of students spread across the globe can learn just about anything without ever setting foot in a classroom. But online learning systems face unique challenges in certain aspects of their operations, including challenges in timely grading large volumes of student-submitted work and challenges in delivering feedback to potentially thousands of students in geographically diverse locations.

These grading and feedback challenges are exacerbated when student work submitted to an online platform comprises short answer natural language responses, as opposed to binary or multiple-choice responses. Natural language is an incredibly complex phenomenon that is notoriously difficult to model. Although advances in computer-implemented artificial intelligence (AI), in the subfield of natural language processing (NLP), have increased the capacity of automated systems to extract semantics from digital data representing natural language text, the most powerful models are often large and unwieldy, requiring large amounts of memory and significant device processing resources to implement. Such models can be ineffective in the online learning context as they may be associated with a high degree of latency when deployed over a network in a Client-Server model distributed system.

Further challenges may exist in providing feedback to students on grades received from an online platform employing machine grading techniques. Many machine learning models are inherently "black box," lacking interpretability or explainability. While a lack of machine learning model explainability can be worrisome in a variety of AI applications, these concerns are particularly troublesome in the context of machine grading of short answer responses: Students may be able to learn best when they are able to understand why they got an answer either correct or incorrect or which aspects of a submitted response contributed most to a received grade. A "black box" machine learning model may not facilitate providing such vital student feedback. If a technical solution could be developed to effectively address the aforementioned issues, then it would represent a significant advance in the state of the art.

BRIEF DESCRIPTION OF THE DRAWINGS

In the drawings:

FIG. 4A illustrates a programmed Integrated Gradients technique of one embodiment.

FIG. 4B illustrates a programmed modified Perturbation technique of one embodiment.

DETAILED DESCRIPTION

Figure 1:
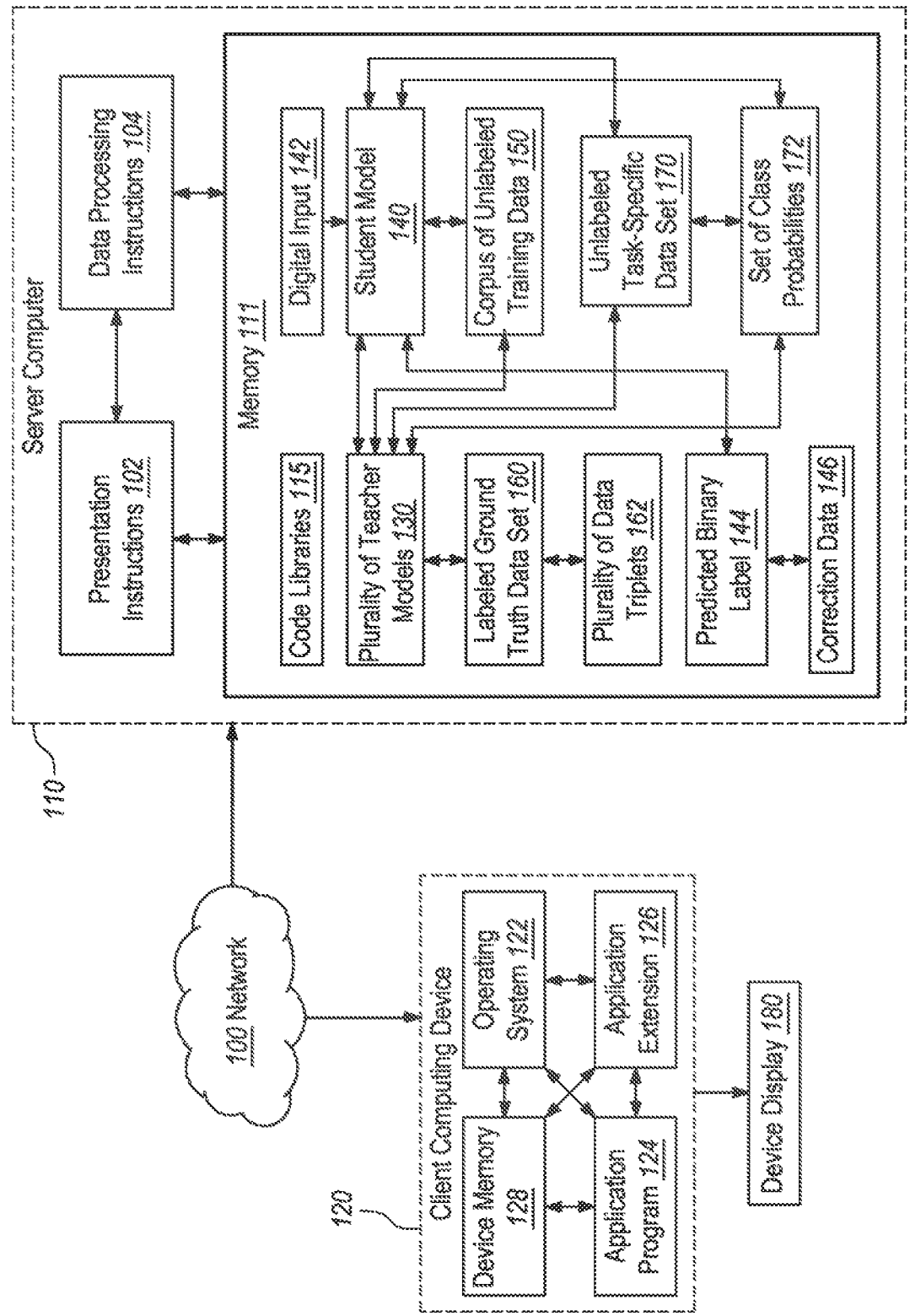
FIG. 1 depicts an example system for Automatic Short Answer Grading.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
   1.0 General Overview
   2.0 Structural & Functional Overview
      2.1 The Automatic Short Answer Grading Task
      2.2 Training Machine Learning Models with Knowledge Distillation
      2.3 Explainability Methods
         2.3.1 Integrated Gradients
         2.3.2 Modified Perturbation Method
      2.4 Example Automatic Short Answer Grading Process
      2.5 Experimental Results
   3.0 Implementation Example—Hardware Overview
   1.0 General Overview In one embodiment, the disclosure provides a programmed computer system or platform implemented via client-server Software as a Service (SaaS) techniques that causes the machine grading of user-submitted short answer responses and the subsequent displaying of correction data, grades, or feedback on an interactive user interface displayed on a display of a client computing device. In one embodiment, the present technology may be incorporated into a machine-implemented real-world Intelligent Tutoring System; and, in embodiments, the disclosed technology represents a novel technical improvement to such a system.

Among other things, the present disclosure teaches systems and methods for receiving, at a server computer, from a client computing device, a digital input representing a user-generated a natural language response to a question prompt provided by the platform. After receiving the digital input, the server computer may execute programmed instructions formatted to cause applying a machine learning model to the digital input to automatically grade the user-generated response answer based on one or more reference answers stored in memory of the server computer. In particular embodiments, a grade may be thought of as a binary output of "1" or "0", as a real or floating-point number in the interval [0, 1], or as a probability of up to 100%.

In embodiments, grading the response answer may comprise executing, at the server computer, programmed instructions formatted to cause classifying the response answer or predicting a binary label for the response answer, where a label of "1" may represent a correct user response and a label of "0" may represent an incorrect user response. In embodiments, the programmatically determined grade associated with the response answer may also indicate a programmatically predicted probability of a classification of the response answer being "true" (in other words, a likelihood of the label being "1" or "correct").

In embodiments, a machine learning model programmatically executed at the server computer to grade short answer responses may be a multi-layer bidirectional Transformer encoder. Said model may be a Student model programmatically trained, at the server computer, by a linear ensemble of trained Teacher models using Knowledge Distillation (KD).

In embodiments, the server computer may transmit display instructions to a client computing device, the display instructions formatted to cause the display of correction data indicating a predicted binary label for a student response answer in a graphical user interface (GUI) displayed on a device display of a client computing device. In embodiments, the server computer may transmit additional display instructions to the client computing device, the additional display instructions formatted to cause the display of explainability data or feedback.

Technical advantages of embodiments of the disclosed technology include grading and providing feedback for answers in real-time in a cost-effective way. Embodiments may avoid slow and expensive steps of manually labeling a large dataset of reference and student answer pairs and may minimize computing costs needed to train and deploy an ASAG model by effectively incorporating Knowledge Distillation (KD) into a model training process.

One example embodiment involves: digitally storing, in memory of a server computer, a plurality of machine learning models, the plurality of machine learning models comprising a plurality of Teacher models and a Student model, each machine learning model comprising a multi-layer bidirectional Transformer encoder; updating, in the memory of the server computer, each machine learning model by programmatically training that model with at least one corpus of unlabeled training data using Masked Language Modeling; updating, in the memory of the server computer, each Teacher model by further programmatically training that Teacher model to perform an Automatic Short Answer Grading task with a labeled ground truth data set, the labeled ground truth data set comprising a plurality of data triplets, each data triplet comprising a response text, a corresponding reference answer text, and a corresponding binary label; executing each of the Teacher models to cause programmatically generating and storing, in the memory of the server computer, a respective set of class probabilities on an unlabeled task-specific data set for the Automatic Short Answer Grading task; updating, in the memory of the server computer, the Student model by further programmatically training the Student model, with the unlabeled task-specific data set, to minimize a Mean Squared Error between predictions of the Student model and a weighted average of predictions of a linear ensemble of the Teacher models; receiving, at the server computer, digital input comprising a target response text and a corresponding target reference answer text; programmatically inputting the target response text and the corresponding target reference answer text to the Student model, thereby outputting a corresponding predicted binary label; and causing to be displayed, in a graphical user interface displayed on a device display of a client computing device, correction data indicating the corresponding predicted binary label.

One embodiment may include the plurality of Teacher models being programmed as a ROBERTa model, a Sentence-BERT model, and a Universal Sentence Encoder model, and the Student model being programmed as one of a Mobile BERT model, a SmallBERT model, or a MiniBERT model.

One embodiment may include transmitting, from the server computer to the client computing device, first display instructions that are formatted to cause displaying, in the graphical user interface, the target response text and the corresponding target reference answer text with the correction data indicating the corresponding predicted binary label.

One embodiment may include each of the target response text and the corresponding target reference answer text comprising digital data representing one or more words, and a respective token being used to represent, in the memory of the server computer, each word represented in the digital data.

One embodiment may include transmitting, from the server computer to the client computing device, second display instructions that are formatted to cause indicating, in the graphical user interface, a sequence of one or more key words represented in at least one of the target response text or the corresponding target reference answer text that contributed most to the Student model programmatically determining the corresponding predicted binary label.

One embodiment may include executing instructions implementing Integrated Gradients to programmatically compute an attribution score for each token based on a corresponding set of programmatically determined gradients of the predicted binary label with respect to each token, and the second display instructions being formatted to cause the indicating based on the computed attribution scores.

One embodiment may include transmitting, from the server computer to the client computing device, third display instructions that are formatted to cause displaying, in the graphical user interface of the client computing device, highlighting on each word represented in each of the target response text and the corresponding target reference answer text caused to be displayed in the graphical user interface, each word being attributed a positive attribution score being highlighted, within a first color gradient, with a first level of highlighting corresponding to a magnitude of the positive attribution score, and each word being attributed a negative attribution score being highlighted, within a second color gradient, with a second level of highlighting corresponding to a magnitude of the negative attribution score.

One embodiment may include transmitting, from the server computer to the client computing device, fourth display instructions that are formatted to cause displaying, in the graphical user interface of the client computing device, a grade representing a computed probability associated with the corresponding predicted binary label.

One embodiment may include the correction data caused to be displayed in the graphical user interface further indicating if the target response text is correct or incorrect based on whether the computed probability associated with the corresponding predicted binary label exceeds a threshold probability stored in the memory of the server computer.

One embodiment may include executing instructions programmed to: determine that the target response text is incorrect because the computed probability associated with the corresponding predicted binary label did not exceed the threshold probability stored in the memory of the server computer; identify a set of phrases, each phrase being a unique sequence of one or more words being sequentially represented in the corresponding target reference answer text but not being sequentially represented in the target response text; and identify the sequence of one or more key words that contributed most to the Student model programmatically determining the corresponding predicted binary label by executing instructions implementing a Perturbation technique to select the phrase of the set of phrases the position-wise inclusion of which in the target response answer text would have most increased the computed probability associated with the corresponding predicted binary label.

2.0 Structural & Functional Overview

FIG. 1 depicts an example system for automatic prediction of important content. FIG. 1, and the other drawing figures and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of machine grading of short answers with explanations. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, a distributed computer system comprises a server computer 110 that is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, the client computing device 120, and other elements of the system may each comprise an interface compatible with the network 100 and may be programmed or configured to use standardized protocols for communication across the networks such as TCP/IP, Bluetooth, or higher-layer protocols such as HTTP, TLS, and the like.

In one embodiment, client computing device 120 may be a computer that includes hardware capable of communicatively coupling the device to one or more server computers, such as server computer 110, over one or more service provides. For example, the client computing device 120 may include a network card that communicates with server computer 110 through a home or office wireless router (not illustrated in FIG. 1) that is communicatively coupled to an internet service provider. The client computing device 120 may be a smartphone, personal computer, tablet computing device, PDA, laptop, or any other computing device capable of transmitting and receiving information and performing the functions described herein.

In one embodiment, the client computing device 120 may comprise device memory 128, operating system 122, application program 124, and application extension 126. In one embodiment, client computing device 120 hosts and executes the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 comprises a conventional internet browser application that is capable of communicating over network 100 to other functional elements via HTTP and is capable of rendering dynamic or static HTML, XML, or other markup languages, including displaying text, images, accessing video windows and players, and so forth. In embodiments, server computer 110 may provide an application extension 126 for application program 124 through which the aforementioned communication and other functionality may be implemented. In embodiments, a device display 180, such as a screen, may be coupled to the client computing device 120.

The server computer 110 may be implemented using a server-class computer or other computer having one or more processor cores, co-processors, or other computers. The server computer 110 may be a physical server computer and/or virtual server instance stored in a data center, such as through cloud computing. In one embodiment, server computer 110 may be implemented using two or more processor cores, clusters, or instances of physical machines or virtual machines, configured in a discrete location, or co-located with other elements in a datacenter, shared computing facility, or cloud computing facility. For example, server computer 110 may comprise a first computing device programmed to train a machine learning model by executing programmed instructions implementing Knowledge Distillation and one or more additional computing devices programmed to grade student answers in a Client-Server distributed system.

Referring again to FIG. 1, in one embodiment, server computer 110 may comprise data processing instructions 104 coupled to both presentation instructions 102 and memory 111. The memory 111 may represent any memory accessible by the server computer 110 including a relational database, a data lake, cloud data storage, local hard drives, computer main memory, or any other form of electronic memory. In various embodiments, server computer 110 may store and execute sequences of programmed instructions of various types to cause execution of various methods. In example only, server computer 110 may execute the data processing instructions 104 and the presentation instructions 102 in various programmed methods, but server computer 110 may also execute other types of programmed instructions in particular embodiments. The data processing instructions 104 may be executed by the server computer 110 to process or transform data, such as by executing a programmed machine learning model, or to cause data stored in memory 111 to be transmitted to client computing device 120 over the network 100. In various embodiments, presentation instructions 102 may be executed by server computer 110 to cause presentation in a display of a computing device communicating with server computer 110 over network 100 (such as client computing device 120) or to cause the transmission of display instructions to such a computing device, the display instructions formatted to cause such presentation upon execution.

Rather than comprising a general-purpose computer, the server computer 110 is specially configured or programmed with the functional elements shown in FIG. 1. In embodiments, a plurality of Teacher models 130 may be stored in memory 111 of server computer 110. Each Teacher model of the plurality of Teacher models 130 may comprise a multi-layer bidirectional Transformer encoder. In one embodiment, a Student model 140 is stored in memory 111 of server computer 110. The Student model 140 may also comprise a multi-layer bidirectional Transformer encoder. Each of these machine learning models may be associated with various parameters stored in memory 111 that are updated by server computer 110 executing the data processing instructions 104 according to various model training techniques described herein. In embodiments, server computer 110 may also store and/or utilize a variety of other machine learning models not depicted in FIG. 1.

In embodiments, various training, validation, testing, input, or result data sets may be stored in memory 111 and programmatically accessed by server computer 110 in conjunction with various machine learning models, including the plurality of Teacher models 130 and the Student model 140. For example, a corpus of unlabeled training data 150 may be stored in memory 111. The corpus of unlabeled training data 150 may be used to update, in memory 111, model parameters of the plurality of Teacher models 130 and/or the Student model 140, under full programmatic control, by server computer 110 executing data processing instructions 104. In one embodiment, data processing instructions 104 are formatted to cause execution of a Masked Language Modeling technique at server computer 110 to cause said updating.

In another example, a labeled ground truth data set 160 may be stored in memory 111. In one embodiment, the labeled ground truth data set 160 comprises digital training data directed to an Automatic Short Answer Grading (ASAG) task, such as a plurality of data triplets 162, each data triplet comprising a digitally stored association of a response text, a reference answer text, and a binary label. Each reference answer text and each binary label correspond to the response text. Server computer 110 may be programmed to execute data processing instructions 104 formatted to cause fine-tuning of the plurality of Teacher models 130 using the labeled ground truth data set 160. In this context, fine-tuning may comprise updating model parameters of the plurality of Teacher models 130 in memory 111 by executing inference techniques under full programmatic control using the labeled ground truth data set 160.

Referring again to FIG. 1, in one embodiment, a set of class probabilities 172 on an unlabeled task-specific data set 170 for the Automatic Short Answer Grading task may be stored in memory 111. Each element of the set of class probabilities 172 may have been generated, for example, by the server computer 110 executing data processing instructions 104 formatted to cause executing a respective machine learning model of the plurality of Teacher models 130.

In one embodiment, server computer 110 may execute data processing instructions formatted to cause further programmatically training the Student model 140, with the unlabeled task-specific data set 170 and using the set of class probabilities 172, to minimize a Mean Squared Error 310 (FIG. 3) between predictions of the Student model 140 and a weighted average of predictions of a linear ensemble of the plurality of Teacher models 130. In one embodiment, this further training of the Student model 140 may be characterized an example of applying a Knowledge Distillation (KD) technique under full programmatic control.

In one embodiment, digital input 142 is stored in memory 111 of server computer 110. In one embodiment, digital input 142 may comprise a target response text and a corresponding target reference answer text pertaining to a specific short answer question. The digital input 142 may have been received by server computer 110 from client computing device 120. In one embodiment, server computer 110 may execute data processing instructions 104 formatted to cause processing of the digital input 142, using a trained Student model 140, to cause generating and storing digital data comprising a predicted binary label 144 and associated correction data 146 corresponding to the digital input 142. Various embodiments of the correction data 146 are described further herein with greater specificity.

In one embodiment, in order to execute the various techniques described in this disclosure, server computer 110 may execute functions defined or specified in one or more code libraries 115, information of which may be stored in memory 111 or dynamically accessible by server computer 110. In one embodiment, the code libraires 115 may comprise one or more PYTHON libraries. In one embodiment, the code libraries 115 may comprise TENSORFLOW, PYTORCH, TRANSFORMERS, KERAS, ONNX, and/or SIMPLE TRANSFORMERS. The code libraries 115 may also comprise other code libraries 115 commonly used in the art of Data Science and/or Machine Learning, which would be known by a person having ordinary skill in those arts, including NUMPY and/or PANDAS, or others.

2.1 The Automatic Short Answer Grading Task

An Automatic Short Answer Grading (ASAG) task may be characterized as a task of computer-assisted grading of a student written short answer given a reference answer. The term "short answer" is flexible and might be applied to answers ranging from a few words to a few sentences. A goal of grading may be to evaluate student performance. On the other hand, a goal of assessment may be to improve student learning, and, in some circumstances, assessment may only be achieved after grading. Grading may therefore play an important role in assessment, along with the transmission of corrective feedback that can help students improve their answers.

ASAG may be posed as a regression problem with two inputs: a reference answer and a student written answer (a response answer). Programmed machine learning models of embodiments may be trained, at a server computer 110, to estimate the probability of the student answer being correct given the reference answer. Particular embodiments may use Integrated Gradients or a modified Perturbation method to explain programmed machine learning model predictions by identifying words with positive and negative attributions in the reference answer and the written answer. These explanations may act as corrective feedback by explicitly identifying parts of the answer the student either missed or was incorrect about.

Each labeled example of an ASAG task can be represented as a triple (R, S, y), where R is a reference answer sentence, S is a student answer sentence, and y∈ {0,1} is a binary label indicating if the written answer is correct or not. Thus, the ASAG task can be described as estimating the conditional probability P(y|R,S).

2.2 Training Machine Learning Models with Knowledge Distillation

Figure 3:
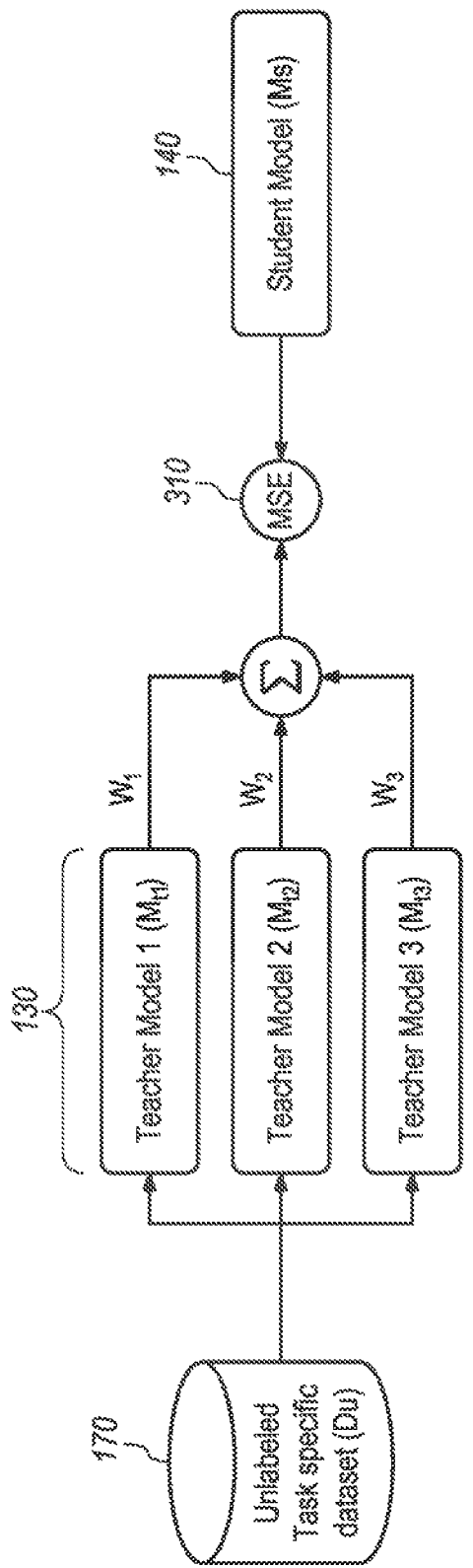
FIG. 3 illustrates a programmed Knowledge Distillation technique of one embodiment.

FIG. 3 illustrates a programmed Knowledge Distillation technique of one embodiment.

Knowledge Distillation (KD) may be characterized as a process of transferring knowledge from one or more larger or more accurate "Teacher model(s)" $M_t$ to a smaller "Student model" $M_s$ by minimizing the difference of the between the Teacher model and Student model 140 predictions on an unlabeled task specific data set $D_u$ 170. In embodiments, $D_u$ 170 may come from a similar distribution as a labeled ground truth data set $D_g$ and may be much larger than $D_g$ since it may be relatively inexpensive to gather.

In embodiments, a Teacher model $M_t$ may be first pre-trained, at server computer 110, using a Masked Language Modeling (MLM) objective on a large corpus of unlabeled data. Generally known examples of such a large corpus may be WIKIPEDIA or CC-NEWS, but many others are possible. In embodiments, training the Teacher model $M_t$ on such a large corpus may ensure that the Teacher model $M_t$ captures general linguistic knowledge. In embodiments, a Student model 140 $M_s$ may be trained on the same, or a similar, corpus for similar reasons. In embodiments, parameters of the Teacher model $M_t$ may then be fine-tuned using $D_g$. In embodiments, because the Teacher model $M_t$ was already effectively "primed" by training on the large corpus of unlabeled data, it may be fine-tuned to learn the necessary ASAG task-specific information with potentially just a few hundred (or even less) examples from $D_g$, potentially preventing the need for a slow and expensive process of manually labeling a large number of examples using human domain-specific experts.

In embodiments, to effectuate Knowledge Distillation (KD), server computer 110 may execute programmed instructions formatted to cause the Student model 140 $M_s$ to learn from an ensemble of Teacher models. In one embodiment, causing the Student model 140 $M_s$ to learn from a plurality of Teacher models 130 involves executing each of the Teacher models to cause programmatically generating and storing in the memory 111 of the server computer 110, a respective set of class probabilities 172 on the unlabeled task-specific data set 170 $D_u$ for the ASAG task. In one embodiment, KD may then proceed by updating, in the memory 111 of the server computer 110, the Student model 140 $M_s$ by further programmatically training the Student model 140 $M_s$, with the unlabeled task-specific data set 170 $D_u$, to minimize a Mean Squared Error 310 between predictions of the Student model 140 $M_s$ and a weighted average of predictions of a linear ensemble of the Teacher models ($M_{t1}$, $M_{t2}$, $M_{t3}$):

$$\frac{1}{\|D_u\|}\sum_{j\in D_u}\left[M_s(j) - \sum_{i=1}^{3} w_i \times M_{ti}(j)\right]^2$$

Programmatically learning from an ensemble of Teacher models may enable knowledge diversity, thereby potentially leading to the creation of a more robust Student model 140 $M_s$. One embodiment may use a plurality of Teacher models 130, each of the Teacher models being programmed as one of a ROBERTa model, a Sentence-BERT model, or a Universal Sentence Encoder (USE) model. In embodiments, distilling knowledge from a linear ensemble of these three Teacher models may be particularly effective due to a diversity in both model architecture and the datasets that they were pre-trained on. A Student model 140 may be programmed, for example, as a MobileBERT model, a SmallBERT model, or a MiniBERT model, but other models, including other models based on Transformer architecture, are possible.

In embodiments, an implementation may use the techniques described in any of the following, and the reader of the present disclosure is presumed to understand those techniques: Yinhan Liu et al., "Roberta: A robustly optimized bert pretraining approach" (2019) arXiv preprint arXiv:1907.1169; Nils Reimers et al., "Sentence-bert: Sentence embeddings using siamese bert-networks," *Proceedings of the* 2019 *Conference on Empirical Methods in Natural Language Processing* (2019), Association for Computational Linguistics; Daniel Cer et al., "Universal sentence encoder" (2018), arXiv preprint arXiv:1803.11175; Zhiqing Sun et al., "Mobilebert: a compact task-agnostic bert for resource-limited devices" (2020), arXiv preprint arXiv: 2004.02984; and, Iulia Turc et al, "Well-read students learn better: On the importance of pre-training compact models" (2019), arXiv preprint arXiv:1908.08962v2.

2.3 Explainability Methods

Particular embodiments of the disclosed technology may use a variety of techniques to effectively deliver grades, feedback, or correction data 146 from server computer 110 to a user of client computing device 120 related to an ASAG task. Because machine learning models underly the systems of methods of particular embodiments of the disclosed technology, such grades, feedback, or correction data 146 may take the form of machine learning model explainability data or interpretability data. Embodiments of the disclosed technology provide a technical advantage of providing specific, relevant, and targeted feedback in a streamlined manner. In example, embodiments may use Integrated Gradients or a novel modified Perturbation method to programmatically generate grades, feedback, or correction data 146. Server computer 110 may then execute programmed instructions configured to cause the display of this targeted feedback by client computing device 120, such as on device display 180, and such as in a GUI displayed by application program 124 or application extension 126.

2.3.1 Integrated Gradients

FIG. 4A illustrates a programmed Integrated Gradients technique of one embodiment.

Integrated Gradients (IG) may be characterized as an Explainable AI technique that attributes an importance score to each input feature of a machine learning model based on gradients of the model output with respect to its input. In particular, IG techniques may compute an attribution score for each input feature by considering the integral of the gradients taken along a straight line from a baseline input to the actual input.

If x is the actual input and x' is the baseline input to the Student model 140 $M_s$ each with i, then for each feature i, the Riemann sum approximation of the attribution score $A_i$ may be calculated by $$A_i = (x_i - x'_i) \times \sum_{k=1}^{n} \frac{\partial M_s\left(x' + \frac{k}{n} \times (x - x')\right)}{\partial x_i} \times \frac{1}{n}$$

where n equals the number of steps in the Riemann sum approximation.

In embodiments, a proper choice of baseline is important for proper feature attribution since an incorrect baseline can mask the importance of a feature. An ideal baseline may be one for which a model predicts a probability of 0.5. Using an all-zero baseline may be inappropriate since it essentially represents both a reference answer and a student answer as a sequence of zeroes; and, hence a model would tend to predict a probability close to 1 because both the inputs have the same tokens. To mitigate this, the unlabeled task specific data set 170 $D_u$ may be augmented with artificial inputs where both the reference answer and the student answer are represented as a sequence of 2 s with varying sequence length and label 0.5 during the programmatic training of Student models 140 $M_s$ of embodiments at server computer 110. In embodiments, this all-two input pair may then be used as a baseline for IG attributions.

FIG. 4A shows two reference answers 412 and two corresponding student written answers 422 (response answers) along with their grades 432 predicted by, for example, the SmallBERT Student model of embodiments and the IG attributions of the words in the inputs displayed with a type of highlighting depending on the type of attribution (positive versus negative).

In one embodiment, one or more references answers 412 may be displayed in a reference pane 410 of a graphical user interface (GUI) caused by server computer 110 to be displayed in a device display 180 of client computing device 120. As depicted, one or more student written answers 422 may be displayed in a response pane 420 which may be displayed alongside the reference pane 410 in the GUI. As further depicted, one or more corresponding grades 432 may also be displayed alongside the one or more reference answers 410 and the one or more student answers 422, in a grade pane 430 of the GUI.

In one embodiment, the grades 432 (depicted in FIG. 4A as 0.94 and 0.67) are one example of correction data 146 indicating a respective predicted binary label corresponding to a pair consisting of a reference answer 412 and a student written answer 422 (a response answer). For example, a grade of 0.94 may indicate that a binary label for the corresponding answer pair is likely to be one, perhaps with a 94% predicted probability. This relatively high grade or predicted probability of 0.94 may indicate that the reference answer 412 and corresponding student written answer 422 (response answer) may be semantically similar, and, in any case, may have a high likelihood of representing a "true" or "correct" pair within the ASAG task.

In one embodiment, server computer 110 may execute programmed instructions formatted to cause the correction data 146 caused to be displayed in the GUI to further indicate if a student written answer 422 (a response answer) is correct or incorrect based on whether the computed probability associated with the corresponding predicted binary label (in example, the grade 432) exceeds a threshold probability stored in the memory of the server computer 110. For example, referring to FIG. 4A, server computer 110 may have been programmed to cause the first student written answer 422 to have a "CORRECT" label displayed next to it in the GUI because 0.94 exceeded a threshold probability (in example, a threshold probability of 0.70). On the other hand, server computer 110 may have been programmed to cause the second student written answer 422 to have an "INCORRECT" label displayed next to it in the GUI because 0.067 did not exceed the example threshold probability of 0.70. Although such CORRECT/INCORRECT labels are not depicted in FIG. 4A, they may be expected to be used in particular embodiments.

Referring again to FIG. 4A, in the second sentence pair, IG may have been used to identify "specialists" and "managers" to be the words with highest negative attribution scores in the reference answer. Their absence in the written answer would hurt the student's grade more than the absence of other words and hence their inclusion would have helped the student's grade more than the inclusion of other words like "senior" or "people" from the correct answer. For example, after appending "specialists" to the student answer, the probability of being correct might go up to 0.81 from 0.67, and after including both "specialists" and "managers", the probability of being correct might increase further to 0.90, thus showing how this specific feedback may be helpful to students to improve their answers by pinpointing exactly what is missing in their answers and how important it is.

Although FIG. 4A is a black and white figure for which highlighting is visualized using different styles of markup around certain displayed words, one embodiment may use colored highlighting, such as red and green highlighting, to reflect attribution scores. For example, words associated with negative attribution scores could be caused by server computer 110 to be highlighted in red, while words with positive attribution scores could be caused to be highlighted in green. In embodiments, the server computer 110 may execute presentation instructions 102 formatted to cause the highlighting within one or more gradients, such as by transmitting display instructions to client computing device 120 formatted to effectuate the highlighting in a GUI provided by application program 124 or application extension 126 running in an environment provided by operating system 122. For example, if "specialists" and "managers" were indeed the words with the highest negative attributions scores, then they could be caused, by server computer 110, to be highlighted with a darker red, while a word like "make" (assuming it had a low-magnitude negative attribution score) could be highlighted with a lighter red. On the other hand, the word "decision" appears in both the reference answer 412 and the corresponding student written answer 422, meaning that it would have a positive attribution score. If "decision" had a relatively high positive attribution score, then server computer 110 may be programmed to execute presentation instructions 102 formatted to cause "decision" to be highlighted in the GUI with a bright green among various possible shades or values of green within a green gradient.

2.3.2 Modified Perturbation Method

Besides Integrated Gradients, particular embodiments of the disclosed technology may execute, at the sever computer 110, programmed instructions formatted to cause the execution of one or more additional or substitute machine learning model interpretability or explainability techniques to generate and transmit feedback to the client computing device 120. Certain of the aforementioned additional or substitute techniques may include a novel modified Perturbation method applied specifically to the ASAG task.

FIG. 4B illustrates a programmed modified Perturbation technique of one embodiment.

An example modified Perturbation technique involves, for each written answer that is graded "INCORRECT" (for example, because it received a score <0.8 or another threshold), by one embodiment, executing programmed instructions at the server computer 110 that are formatted to cause: (1) identifying one or more words or sequences of words in the reference answer 412 that are missing from the student written answer 422, (2) from all the missing words and/or missing sequences, identifying the most important missing word or contiguous sequence of words (in other words, the key sequence of words the position-wise inclusion of which in the student written answer 422 would have increased the grade the most), and (3) returning the key sequence of words (in other words, a phrase) as output caused to be displayed by client computing device 120, for example in a GUI displayed on device display 180.

FIG. 4B shows a reference answer 412 and a corresponding student written answer 422 (response answer) along with a grade 432 predicted by, for example, the SmallBERT Student model of embodiments. The reference answer 412 comprises a first sequence of words "inferior", "articular", and "process". The student written answer 422 comprises a second sequence of words "superior", articular", and "facet". The corresponding grade 432 is 0.27.

A modified Perturbation method of embodiments involves sever computer 110 first executing programmed instructions formatted to cause identifying all words (or sequences of words) present in the reference answer 412 but not the student written answer 422. In the example of FIG. 4B, such missing words are the words "inferior" and "process". In this example, there are no contiguous sequences of missing words, since "inferior" and "process" are separated by "articular" which is not missing from the student written answer 422.

Next, an importance score for each of the missing words could be determined by applying Student model 140 to a set of modified student written answer, each modified student written answer comprising a respective missing word which is position-wise included. For example, the modified student answers in this case might be ["inferior", "superior", "articular", "facet"] (including the missing word "inferior") and ["superior", "articular", "facet", "process"] (including the missing word "process"). Notably, the data processing instructions 104 executed by server 110 might be formatted to cause such position-wise inclusion: "inferior" may have been prepended to the beginning of the first modified student answer since it was at the beginning of the reference answer 412 and "process" may have been appended to the end of the second modified student answer since it was at the end of the reference answer 412. Server computer 110 may execute programmed instructions formatted to cause determining grades 432 for each modified student answer using the Student model 140 (as described further herein with more specificity). For example, the first modified student answer including the word "inferior" might programmatically be assigned a grade of 0.49, while the second modified student answer including the word "process" might programmatically be assigned a grade of 0.33. Hence, the word "inferior" would be programmatically identified as more important than the word "process" to success on the ASAG task for the particular input discussed above. In one embodiment, these respective grades, 0.49 and 0.33 are an example of missing word importance scores.

In embodiments, server computer 110 is programmed to transmit display instructions to client computing device 120, the display instructions formatted to cause highlighting based on the missing word importance scores determined by the modified Perturbation technique. Referring to the previous example, the words "inferior" and "process" might be caused to be highlighted in the GUI supplied by application program 124 or application extension 126 of client computing device 120 since their position-wise inclusion in student written answer 412 (FIG. 4B) would have improved the student's grade 432. And "inferior" might have been highlighted more strongly or more brightly within the GUI (within a color gradient) because it was programmatically determined to be more important. But in particular embodiments, only a word or sequence of words (phrase) that would have raised the student's grade 432 over a threshold grade (for example 0.4), or by a threshold amount (for example, 0.1) is highlighted in the GUI. In the embodiment illustrated in FIG. 4B, the word "inferior" is highlighted in the GUI, while the word "process" is not, because the word "inferior" would have raised the corresponding grade 432 above a threshold grade of 0.4 (0.49>0.33) had it been position-wise included in the student written answer 412, while the word "process" is not highlighted because it's position-wise inclusion in the student written answer 412 would not have caused the corresponding grade 432 to exceed the threshold grade of 0.4 (0.33<0.4).

Comparing the modified Perturbation techniques of section 2.3.2 and the Integrated Gradients (IG) techniques of section 2.3.1 for extracting machine learning model explainability information for use in generating correction data or feedback at server computer 110, several notable distinctions become apparent. First, unlike with the IG technique, when using the modified Perturbation technique, a measure of importance may not be directly generated for words that the student correctly included in the student's submitted answer. To generate measures of importance for these words, the modified Perturbation technique may require systematically removing each word that the student correctly included to generate second types of modified student written answers and subsequently determining a relevant drop in grade 432 by inputting the second types of modified student written answers to a Student model 140 to output respective grades 432. Referring again to the previous example, the word "articular" could be removed to see how the exclusion of that word would have modified the corresponding grade 432 displayed in grade pane 430 of the GUI. Second, the latency of the novel "Perturbation"-based approach of embodiments may be lower than with the potentially more granular IG approach of embodiments if the number of missing words is relatively small (for embodiments that provide feedback only about the missing words, instead of all of the words).

2.4 Example Automatic Short Answer Grading Process

Figure 2:
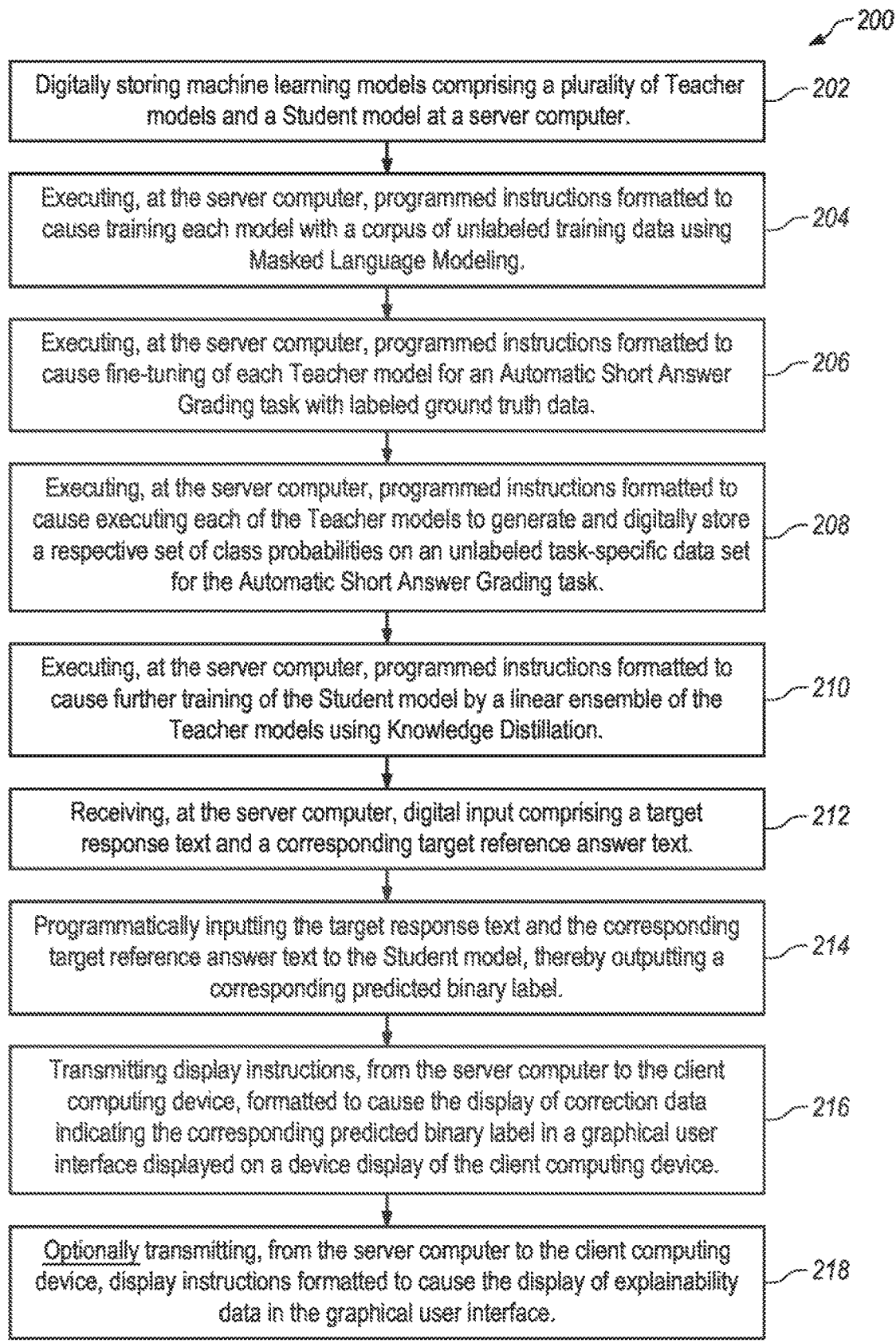
FIG. 2 depicts an example computer-implemented or programmed method for Automatic Short Answer Grading.

FIG. 2 depicts an example computer-implemented or programmed method 200 for Automatic Short Answer Grading.

FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

Referring to FIG. 2, in one embodiment, programmed method 200 may begin execution at step 202 with digitally storing programmed machine learning models comprising a plurality of Teacher models 130 and a Student model 140 at a server computer 110. In particular embodiments, one or more of these programmed machine learning models may instead be stored in and subsequently accessed from device memory 128 of client computing device 120.

In one embodiment, programmed method 200 may execute step 204 after step 202. Step 204 involves executing, at the server computer 110, programmed instructions formatted to cause training each Teacher model of the plurality of Teacher models 130 and the Student model with at least one corpus of unlabeled training data 150 using Masked Language Modeling.

In one embodiment, programmed method 200 may execute step 206 after step 204. Step 206 involves executing, at the server computer 110, programmed instructions formatted to cause fine-tuning of each Teacher model of the plurality of Teacher models 130 for an Automatic Short Answer Grading task with a labeled ground truth data set 160, which may comprise a plurality of data triplets 162.

In one embodiment, programmed method 200 may execute step 208 after step 206. Step 208 involves executing, at the server computer 110, programmed instructions formatted to cause executing each Teacher model of the plurality of Teacher models 130 to generate and digitally store a respective set of class probabilities 172 on an unlabeled task-specific data set 170 for the Automatic Short Answer Grading task.

In one embodiment, programmed method 200 may execute step 210 after step 208. Step 210 involves executing, at the server computer 110, programmed instructions formatted to cause further training of the Student model 140 by a linear ensemble of the plurality of Teacher models 130 using Knowledge Distillation.

In one embodiment, programmed method 200 may execute step 212 after step 210. Step 212 involves receiving, at the server computer 110, digital input 142 comprising a target response text (in example, a student written answer 422 of FIG. 4A) and a corresponding target reference answer text (in example, a reference answer 412 of FIG. 4A).

In one embodiment, programmed method 200 may execute step 214 after step 212. Step 214 involves programmatically inputting the target response text (422) and the corresponding target reference answer text (412) to the Student model, thereby outputting a corresponding predicted binary label 144.

In one embodiment, programmed method 200 may execute step 216 after step 214. Step 216 involves transmitting display instructions, from the server computer 110 to the client computing device 120, formatted to cause the display of correction data 146 indicating the corresponding predicted binary label 144 in a graphical user interface displayed on a device display 180 of the client computing device 120.

In one embodiment, programmed method 200 may optionally execute step 216 after step 214. Step 216 involves transmitting, from the server computer 110 to the client computing device 120, display instructions formatted to cause the display of explainability data, such as machine learning model explainability or interpretability information, in the graphical user interface. Said explainability data may comprise student feedback generated according to, for example, a programmed Integrated Gradients or modified Perturbation technique of embodiments which is described with more specificity herein.

In one embodiment, programmed method 200 may involve server computer 110 accessing information of one or more code libraries 115 to facilitate executing one or more of the aforementioned steps 202, 204, 206, 208, 210, 212, 214, or 216.

2.5 Experimental Results

In various experiments, the labeled ground truth data set 160 $D_g$, consisted of 755 data triplets (element 162 of FIG. 1) manually labeled by a human rater split in a 70%/15%/15% ratio of training/validation/test sets. $D_g$ was imbalanced with an 80%/20% ratio of positive-negative labels. The unlabeled task-specific data set 170 $D_u$ had about 2.3 million referee and student answer pairs from which 50,000 random examples were used as the validation set for the tested Student models 140, while the remaining examples were used for their training. All the Teacher and Student models were finally evaluated on the test split of $D_g$ and corresponding AUC scores are reported in the following Table 1 and Table 2. Because the ASAG task may be considered to overlap with a Semantic Textual Similarity (STS) task (in both definition and formulation), an STS-B dataset was also used in experiments, in addition to the ASAG dataset. The definition and formulation of the Semantic Textual Similarity task is generally described in Daniel Cer et al., "SemEval-2017 task 1: Semantic textual similarity multilingual and crosslingual focused evaluation," *Proceedings of the 11th International Workshop on Semantic Evaluation (SemEval-2017)* (2017), pages 1-14, Vancouver, Canada, Association for Computational Linguistics, and the reader of the present disclosure is presumed to generally understand the STS task.

The conducted experiments compared the performance of the Teacher models of particular embodiments, ROBERTa-Large, Sentence-BERT and USE and the Student models of particular embodiments, MobileBERT, SmallBERT and MiniBERT on STS-B and ASAG datasets. This section 2.5 reports the Spearman Correlation $\rho$ for STS-B and AUC score for ASAG respectively. Because a main objective of the disclosed technology is to cost-effectively assess answers in real-time, the following Table 1 also compares the latency and size of the models, since larger models may be more expensive to deploy and may be likely to be slower in inference compared to smaller models.

To generate the data of Table 1 and Table 2, all the models were trained using a single Nvidia V100 GPU. ROBERTa-Large was fine-tuned with a batch size of 16 and a learning rate of 4e-05 for 10 epochs with early stopping. The three Student models were fine-tuned with a batch size of 32 and a learning rate of 4e-05 for 12 epochs with early stopping and a maximum input sequence length of 64 tokens. ROBERTa-Large was fine-tuned on both STSB and ASAG labelled datasets. Sentence-BERT was fine-tuned on STS-B but not on the ASAG because of unstable gradients. Weights for the individual Teacher models (see FIG. 3) were set based on Teacher model performance on the validation data set. Inference latency was measured on a 6-core Intel Core i7 CPU for an input with 40 tokens and a batch size of 1. The batch size was chosen to be 1 instead of a larger value because large scale Intelligent Tutoring Systems may operate in real-time request-response settings.

As shown in Table 1, ROBERTa-Large was the best performing Teacher model on STS-B and ASAG datasets but it is also the largest model and the second slowest model in inference latency. MobileBERT was the best performing Student model on STS-B and ASAG achieving 96.6% of ROBERTa-Large but with 3.6× faster inference latency and being 14.3× smaller. MiniBERT was the smallest and fastest model matching the performance of MobileBERT on ASAG while being more than 2× smaller and 9× faster than MobileBERT.

TABLE 1

Spearman Correlation ρ and AUC scores on the
test sets of STS-B and ASAG datasets along with
latency and sizes of the Teacher and Student models.

| Model Name | STS-B (ρ) | ASAG (AUC) | Latency (ms) | Size (MB) |
|---|---|---|---|---|
| ROBERTa-Large | 90.46 | 0.88 | 132 | 1430 |
| Sentence-BERT | 85.26 | 0.75 | 138 | 1240 |
| USE | 74.92 | 0.55 | 24 | 810 |
| MobileBERT | 87.40 | 0.85 | 36 | 100 |
| SmallBERT | 85.13 | 0.83 | 8 | 115 |
| MiniBERT | 83.66 | 0.85 | 4 | 45 |

TABLE 2

Spearman Correlation ρ on the STS-B test set
before and after Knowledge Distillation (KD) was
programmatically conducted on each of the Student models.

| Model Name | before KD | after KD |
|---|---|---|
| MobileBERT | 84.40 | 87.40 |
| SmallBERT | 78.80 | 85.13 |
| MiniBERT | 75.40 | 83.66 |

Notably, as seen in Table 2, training the models for ASAG with KD using soft teacher labels helped the models perform better on STS even after they were fine-tuned using the STS ground truth dataset. Table 2 shows the spearman correlation ρ of the Student models on the STS-B test dataset before and after the KD on ASAG. The Student models exhibited an increase in spearman correlation ρ ranging from 3.6% to 11% with the MiniBERT model showing the largest increase, potentially indicating that smaller models may benefit more with access to a large number of soft teacher labels.

3.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
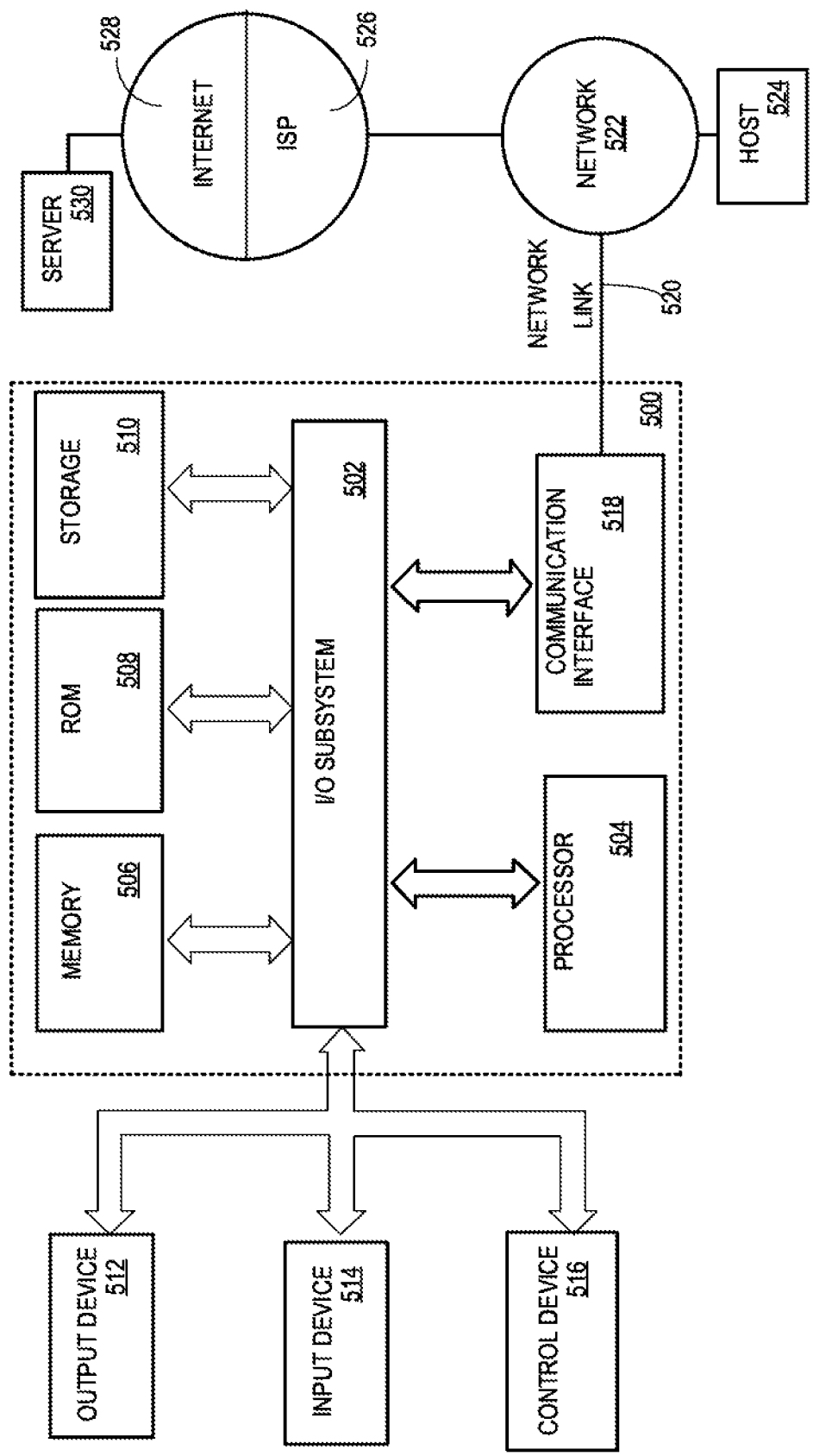
FIG. 5 is a block diagram that illustrates a computer system upon which one embodiment may be implemented.

For example, FIG. 5 is a block diagram that illustrates a computer system 500 upon which one embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (for example, private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method comprising:
digitally storing, in memory of a server computer, a plurality of machine learning models, the plurality of machine learning models comprising a plurality of Teacher models and a Student model, each of the machine learning models comprising a multi-layer bidirectional Transformer encoder and having been trained with at least one corpus of unlabeled training data using Masked Language Modeling;
updating, in the memory of the server computer, each Teacher model by further programmatically training that Teacher model to perform an Automatic Short Answer Grading task with a labeled ground truth data set, the labeled ground truth data set comprising a plurality of data triplets, each data triplet comprising a response text, a corresponding reference answer text, and a corresponding binary label;
executing each of the Teacher models to cause programmatically generating and storing, in the memory of the server computer, a respective set of class probabilities on an unlabeled task-specific data set for the Automatic Short Answer Grading task;

updating, in the memory of the server computer, the Student model by further programmatically training the Student model, with the unlabeled task-specific data set, to minimize an error between predictions of the Student model and predictions of a linear ensemble of the Teacher models;

receiving, at the server computer, digital input comprising a target response text and a corresponding target reference answer text;

programmatically inputting the target response text and the corresponding target reference answer text to the Student model, thereby outputting a corresponding predicted binary label;

causing to be displayed, in a graphical user interface displayed on a device display of a client computing device, correction data indicating the corresponding predicted binary label.

2. The computer implemented method of claim 1, the plurality of Teacher models being programmed as a ROBERTa model, a Sentence-BERT model, and a Universal Sentence Encoder model, and the Student model being programmed as one of a Mobile BERT model, a SmallBERT model, or a MiniBERT model.

3. The computer-implemented method of claim 1, further comprising transmitting, from the server computer to the client computing device, first display instructions that are formatted to cause displaying, in the graphical user interface, the target response text and the corresponding target reference answer text with the correction data indicating the corresponding predicted binary label.

4. The computer-implemented method of claim 3, each of the target response text and the corresponding target reference answer text comprising digital data representing one or more words, and a respective token being used to represent, in the memory of the server computer, each word represented in the digital data.

5. The computer-implemented method of claim 4, further comprising transmitting, from the server computer to the client computing device, second display instructions that are formatted to cause indicating, in the graphical user interface, a sequence of one or more key words represented in at least one of the target response text or the corresponding target reference answer text that contributed most to the Student model programmatically determining the corresponding predicted binary label.

6. The computer-implemented method of claim 5, further comprising executing instructions implementing Integrated Gradients to programmatically compute an attribution score for each token based on a corresponding set of programmatically determined gradients of the predicted binary label with respect to each token, and the second display instructions being formatted to cause the indicating based on the computed attribution scores.

7. The computer-implemented method of claim 6, further comprising transmitting, from the server computer to the client computing device, third display instructions that are formatted to cause displaying, in the graphical user interface of the client computing device, highlighting on each word represented in each of the target response text and the corresponding target reference answer text caused to be displayed in the graphical user interface, each word being attributed a positive attribution score being highlighted, within a first color gradient, with a first level of highlighting corresponding to a magnitude of the positive attribution score, and each word being attributed a negative attribution score being highlighted, within a second color gradient, with a second level of highlighting corresponding to a magnitude of the negative attribution score.

8. The computer-implemented method of claim 5, further comprising transmitting, from the server computer to the client computing device, fourth display instructions that are formatted to cause displaying, in the graphical user interface of the client computing device, a grade representing a computed probability associated with the corresponding predicted binary label.

9. The computer-implemented method of claim 8, the correction data caused to be displayed in the graphical user interface further indicating if the target response text is correct or incorrect based on whether the computed probability associated with the corresponding predicted binary label exceeds a threshold probability stored in the memory of the server computer.

10. The computer-implemented method of claim 9, further comprising executing instructions programmed to:

determine that the target response text is incorrect because the computed probability associated with the corresponding predicted binary label did not exceed the threshold probability stored in the memory of the server computer;

identify a set of phrases, each phrase being a unique sequence of one or more words being sequentially represented in the corresponding target reference answer text but not being sequentially represented in the target response text; and identify the sequence of one or more key words that contributed most to the Student model programmatically determining the corresponding predicted binary label by executing instructions implementing a Perturbation technique to select the phrase of the set of phrases the position-wise inclusion of which in the target response answer text would have most increased the computed probability associated with the corresponding predicted binary label.

11. A computer system comprising:

one or more processors;

digital electronic memory coupled to the one or more processors and storing one or more sequences of stored program instructions which, when executed by the one or more processors, cause the one or more processors to execute:

digitally storing, in memory of a server computer, a plurality of machine learning models, the plurality of machine learning models comprising a plurality of Teacher models and a Student model, each of the machine learning models comprising a multi-layer bidirectional Transformer encoder and having been trained with at least one corpus of unlabeled training data using Masked Language Modeling;

updating, in the memory of the server computer, each Teacher model by further programmatically training that Teacher model to perform an Automatic Short Answer Grading task with a labeled ground truth data set, the labeled ground truth data set comprising a plurality of data triplets, each data triplet comprising a response text, a corresponding reference answer text, and a corresponding binary label;

executing each of the Teacher models to cause programmatically generating and storing, in the memory of the server computer, a respective set of class probabilities on an unlabeled task-specific data set for the Automatic Short Answer Grading task;

updating, in the memory of the server computer, the Student model by further programmatically training the Student model, with the unlabeled task-specific data set, to minimize an error between predictions of the Student model and predictions of a linear ensemble of the Teacher models;

receiving, at the server computer, digital input comprising a target response text and a corresponding target reference answer text;

programmatically inputting the target response text and the corresponding target reference answer text to the Student model, thereby outputting a corresponding predicted binary label;

causing to be displayed, in a graphical user interface displayed on a device display of a client computing device, correction data indicating the corresponding predicted binary label.

12. The system of claim 11, the plurality of Teacher models being programmed as a ROBERTa model, a Sentence-BERT model, and a Universal Sentence Encoder model, and the Student model being programmed as one of a Mobile BERT model, a SmallBERT model, or a MiniBERT model.

13. The system of claim 11, the instructions further executable to cause performance of transmitting, from the server computer to the client computing device, first display instructions that are formatted to cause displaying, in the graphical user interface, the target response text and the corresponding target reference answer text with the correction data indicating the corresponding predicted binary label.

14. The system of claim 13, each of the target response text and the corresponding target reference answer text comprising digital data representing one or more words, and a respective token being used to represent, in the memory of the server computer, each word represented in the digital data.

15. The system of claim 14, the instructions further executable to cause performance of transmitting, from the server computer to the client computing device, second display instructions that are formatted to cause indicating, in the graphical user interface, a sequence of one or more key words represented in at least one of the target response text or the corresponding target reference answer text that contributed most to the Student model programmatically determining the corresponding predicted binary label.

16. The system of claim 15, the instructions further executable to cause performance of executing instructions implementing Integrated Gradients to programmatically compute an attribution score for each token based on a corresponding set of programmatically determined gradients of the predicted binary label with respect to each token, and the second display instructions being formatted to cause the indicating based on the computed attribution scores.

17. The system of claim 16, the instructions further executable to cause performance of transmitting, from the server computer to the client computing device, third display instructions that are formatted to cause displaying, in the graphical user interface of the client computing device, highlighting on each word represented in each of the target response text and the corresponding target reference answer text caused to be displayed in the graphical user interface, each word being attributed a positive attribution score being highlighted, within a first color gradient, with a first level of highlighting corresponding to a magnitude of the positive attribution score, and each word being attributed a negative attribution score being highlighted, within a second color gradient, with a second level of highlighting corresponding to a magnitude of the negative attribution score.

18. The system of claim 15, the instructions further executable to cause performance of transmitting, from the server computer to the client computing device, fourth display instructions that are formatted to cause displaying, in the graphical user interface of the client computing device, a grade representing a computed probability associated with the corresponding predicted binary label.

19. The system of claim 18, the correction data caused to be displayed in the graphical user interface further indicating if the target response text is correct or incorrect based on whether the computed probability associated with the corresponding predicted binary label exceeds a threshold probability stored in the memory of the server computer.

20. The system of claim 19, the instructions further executable to cause performance of:

determining that the target response text is incorrect because the computed probability associated with the corresponding predicted binary label did not exceed the threshold probability stored in the memory of the server computer;

identifying a set of phrases, each phrase being a unique sequence of one or more words being sequentially represented in the corresponding target reference answer text but not being sequentially represented in the target response text; and identifying the sequence of one or more key words that contributed most to the Student model programmatically determining the corresponding predicted binary label by executing instructions implementing a Perturbation technique to select the phrase of the set of phrases the position-wise inclusion of which in the target response answer text would have most increased the computed probability associated with the corresponding predicted binary label.

* * * * *